April 3, 1962  R. M. TUCK ETAL  3,027,720

TRANSMISSION

Filed June 19, 1958  2 Sheets-Sheet 2

INVENTORS
Robert M. Tuck &
BY Harry Fackenthal
W. C. Middleton
ATTORNEY

3,027,720
TRANSMISSION

Robert M. Tuck, Indianapolis, and Harry Fackenthal, Southport, Ind., assignors to General Motors Corporation, Detroit, Mich., a corporation of Delaware
Filed June 19, 1958, Ser. No. 743,049
6 Claims. (Cl. 60—54)

This invention relates to transmissions and more particularly to torque converters having an autoflow fluid supply and cooling system.

In torque converters having a pump element, a turbine element and a stator, it is proposed to provide for the autocirculation of fluid through the operating chamber by connecting a reservoir to the operating chamber at the inlet of the pump element and to provide an outlet at a point adjacent the turbine inlet or pump outlet. It is important that this outlet or return flow pass be separated from the operating chamber of the torque converter. This may be done by placing an annular wall parallel to the forward annular wall of the turbine element to provide a portion of the return flow path through the operating chamber of the torque converter which is separated from the fluid in the operating chamber. In addition, air flow is provided around the reservoir to cool the fluid as it is circulated through the reservoir.

An object of the invention is to provide an autoflow torque converter wherein fluid is withdrawn from the torque converter at a point adjacent the turbine inlet or pump outlet and conducted through a passage separate from the torque converter chamber to the reservoir.

Another object of the invention is to provide in a torque converter having pump, turbine and stator elements located in the torque converter chamber and a source of fluid, a conduit to conduct fluid from the reservoir to the pump inlet and a second conduit to conduct fluid from the turbine inlet through a separate passage distinct from the torque converter chamber to the reservoir.

Another object of the invention is to provide in a torque converter having a pump, turbine and stator located in an operating chamber, a source of fluid under pressure, a supply line connecting the source of fluid to the operating chamber and a supply line connecting a point in the torque converter chamber adjacent the pump inlet directly to the reservoir.

Another object of the invention is to provide in a fluid device, an annular curved outer shell element having a plurality of blades, each having a curved recess in the inner surface adapted to receive an annular curved flexible sheet metal inner shell, said blades being secured in position by a shoulder located at one end of the curved inner shell and the other end of the curved inner shell projecting beyond said blades to provide at least in part an inner shell portion for another bladed member.

These and other objects of the invention will be more apparent from the following description and drawing of a preferred embodiment of the invention.

Figure 1:
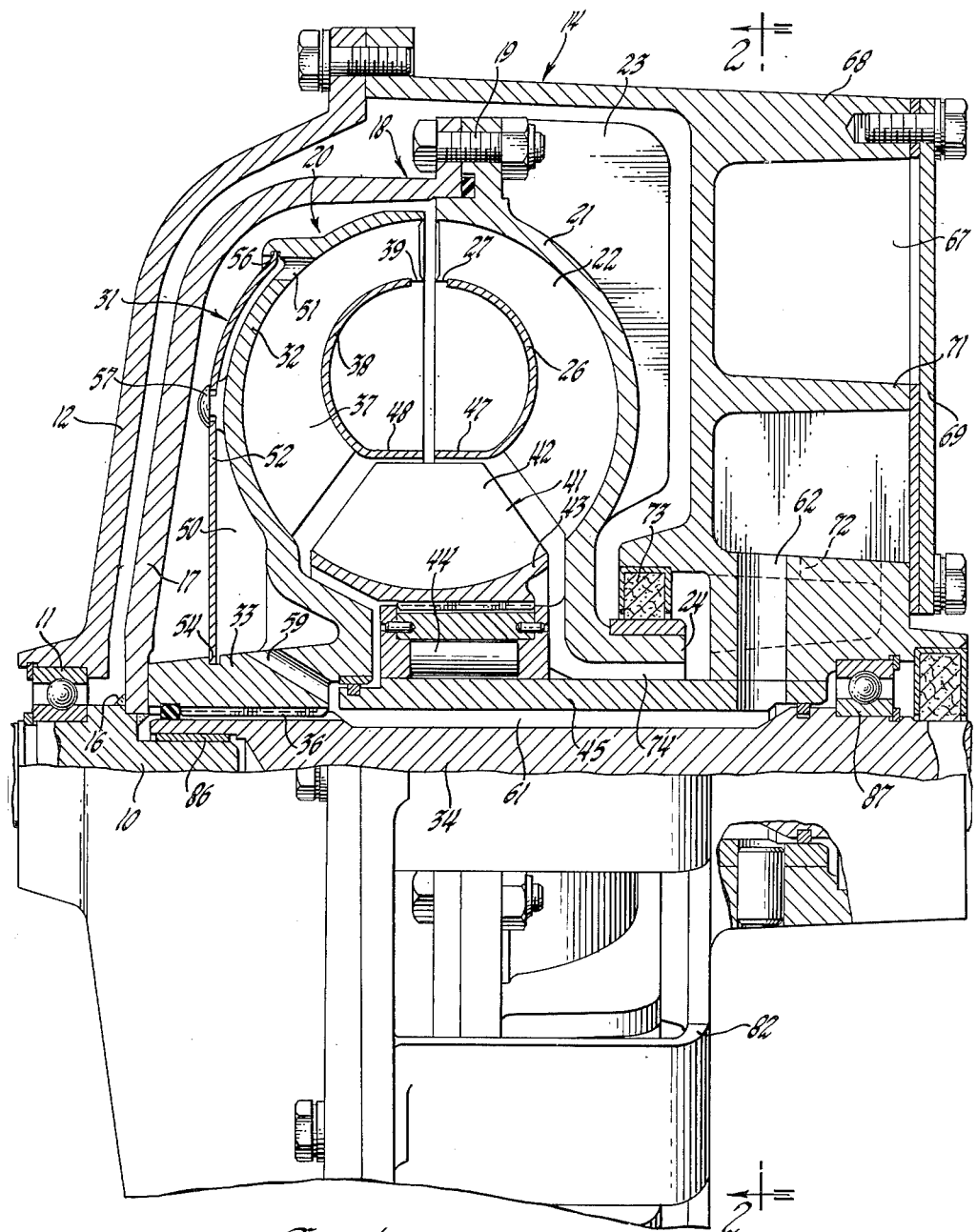
FIG. 1 is a partial view with parts in section showing the torque converter.

The invention may be employed in the torque converter shown in FIG. 1 having an input shaft 10 rotatably mounted in a bearing 11 secured on the forward wall 12 of the transmission housing 14. The input shaft 10 is secured by weld 16 or other suitable means to the forward wall 17 of the torque converter housing 18. The forward wall 17 is connected by suitable flanges and bolts 19 to the rear portion 21 of the torque converter housing which has integrally formed therewith or secured thereto the pump blades 22, the cooling fan blades 23 and a bearing sleeve portion 24. The curved annular inner shell 26 fits the inner edge of the blades 22 and is preferably made of resilient sheet metal so that one edge snaps under the securing tab 27 to secure the inner shell 26 to the pump assembly.

The turbine 31 consists of an outer shell 32 having a hub portion 33 which is secured to the output shaft 34 by suitable splines 36. The outer shell 32 has secured thereto or formed thereon hub blades 37 and a similar curved annular inner shell 38 which fits the inner contour of the turbine blades 37 and fits or snaps under a tab 39 to secure the shell 38 in place. A stator 41 has blades 42 formed on a hub 43 which is mounted by means of a one-way brake device 44 on a ground sleeve 45 formed as a portion of the transmission housing 14. The inner shell of the stator 41 is formed by extensions 47 and 48 which are respectively formed integrally with the inner shell 26 of pump and inner shell 38 of the turbine.

The turbine member 31 also has adjacent its inlet end an aperture 51 extending through the outer shell to the space between the outer shell 32 and an annular plate 52 which is secured and sealed to the turbine 31 by the inner groove 54, the outer groove 56 and a plurality of fasteners 57 to provide a converter outlet passage or conduit 50 from the apertures 51 to the hub passage 59 which is separated by seal 60 from the operating chamber 20 of the torque converter. The passage or passages 59 are connected by the space 61 between the ground sleeve 45 and the output shaft 34 and by converter outlet passage 62 to a reservoir 67 located in a rear portion 68 of the transmission housing 14. The converter inlet passage 72 is connected between the bearing portion 24 and the housing where it is confined by the seal 73 and through axial grooves 74 in the portion 24 to the converter chamber between the stator and the pump or at the pump inlet. For simplicity in manufacture the reservoir 67 is formed as a cavity in the rear portion of the transmission housing 68 and is closed by a plate 69 suitably secured to the housing. Between the converter outlet 62 and inlet 72 at the reservoir 67 there is a T-shaped baffle 71 so that fluid circulates around the reservoir to improve cooling. In heavy duty applications improved cooling may be obtained by passing a cooling fluid through coils (not shown) in the reservoir or by circulating fluid from the reservoir through a heat exchanger.

Figure 2:
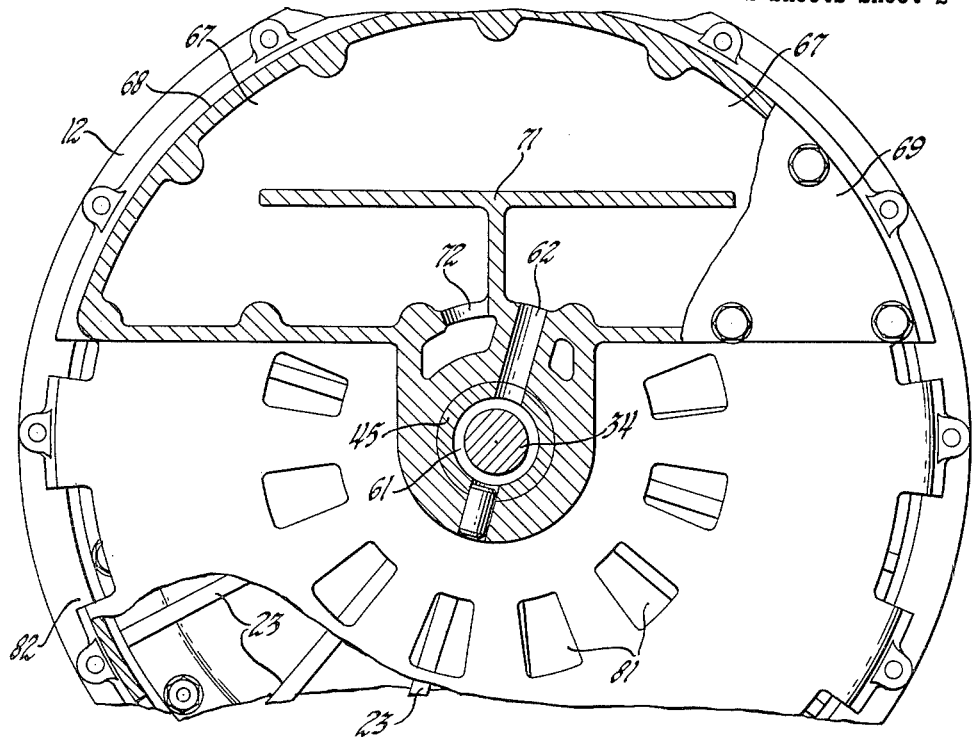
FIG. 2 is a partial sectional view taken on the line 2—2 of FIG. 1.
Figures 3, 4:
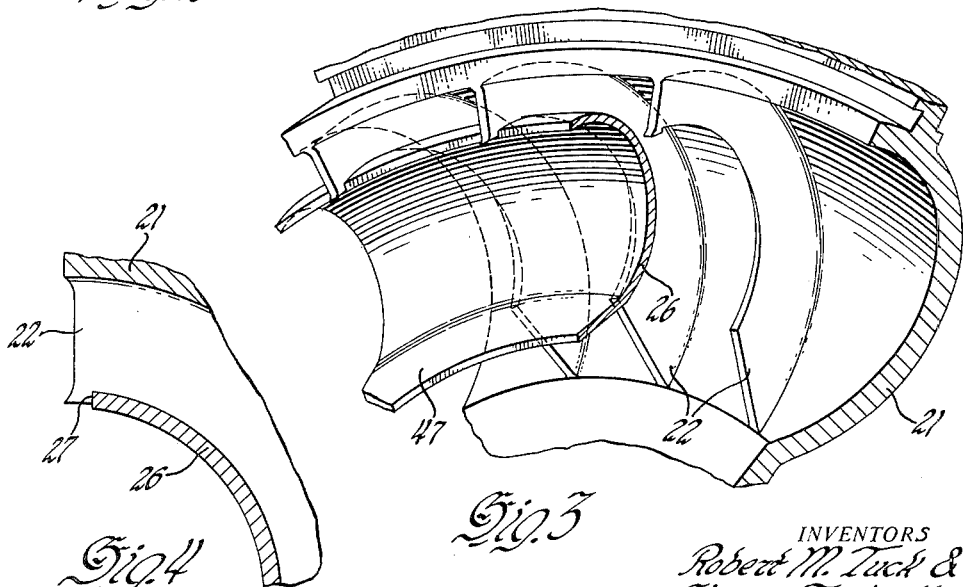
FIG. 3 is a partial perspective view showing a bladed rotor.
FIG. 4 is a partial detail view showing the inner shell securing tab.

The torque converter is also air cooled by the fan blades 23 on the housing portion 21 which draw in air through the centrally located inlets 81 shown in FIG. 2 and expels the air through the outlet 82 at the outer diameter of the housing 68. The output shaft is supported by a forward pilot bearing 86 on shaft 10 and a rear bearing 87 on the housing 68.

The fluid is autocirculated from the reservoir to the torque converter operating chamber and returned to the reservoir by the pressure differential created in the torque converter operating chamber during normal operation. Thus, it is proposed to connect the torque converter inlet to the low pressure zone adjacent the inner diameter of the operating chamber and the outlet to the high pressure zone adjacent the outer diameter of the converter on either side of the turbine shell 32. The outlet passage preferably originates at the outlet apertures 51, located in the high pressure zone in the converter torus between the inner and outer shells of the bladed pump, turbine and stator members, and located in axial alignment with the outlet flow path of the fluid as it leaves the pump and enters the turbine. The combined action of the kinetic and potential pump output energy and the impact action of the fluid flowing into apertures 51 provides a pressure differential between the outlet at apertures 51 and the inlet to provide flow through the converter torus proportional to the converter cooling requirements. That is, flow will be at a maximum at converter stall and a minimum at the coupling stage or 1 to 1 drive. Satisfactory flow to meet the cooling requirements of some converters may be obtained by placing the apertures 51 in shell 32 but nearer the converter axis, or in plate 52 or other locations in the high pressure zone near the outer diameter of the operating chamber.

The outlet flow begins at apertures 51 and is connected by passage 50 between turbine shell 32 and plate 52, passages 59, 61 and 62 to the reservoir 67. The inlet fluid flows from the reservoir 67, via passages 72 and 74 between the pump and stator hubs to the low pressure zone at the pump inlet. It will be noted that the radially inward passage portion 50, though within the converter chamber 20, provides a separate and distinct flow passage through chamber 20 that is not affected by the pressures in the chamber 20 except at the point of inlet 51. In this way the high pressure at the pump outlet and turbine inlet is effectively used to circulate the fluid in these passages to the reservoir.

The above described preferred embodiment of the invention is illustrative of the invention, and it will be apparent to those skilled in the art that other modification may be made within the scope of the appended claims.

We claim:

1. In a fluid drive; an input member, an output member, a housing driven by said input member and providing an operating chamber and having pump means, a turbine element drivingly connected to said output member and located in said operating chamber and having blades and an external wall defining the exterior of the turbine portion of a torus chamber, said turbine element having an inlet at the outer diameter of the torus chamber and an outlet, said pump means being located in said operating chamber and having blades and a wall defining the exterior of the pump portion of the torus chamber, said pump means having an inlet at an inner diameter and an outlet at the outer diameter of the torus chamber to circulate fluid in a torus flow path in the torus chamber from said pump inlet to said pump outlet and to discharge fluid at a high velocity in a direction to enter said turbine inlet and circulate to the turbine outlet and pump inlet, said torus chamber having a low pressure zone adjacent said pump inlet and a high pressure zone in the outer diameter portion of said torus chamber in an area of said pump outlet and turbine inlet, supply means to supply fluid to said torus chamber at said pump inlet in said low pressure zone to substantially fill said torus chamber, and outlet passage means extending radially inward and through said housing in the neighborhood of the axis of the housing connecting said torus chamber to exhaust, said outlet passage means having an initial outlet portion, located in the torus chamber defined by said external walls in said high pressure zone, having a mouth communicating with said high pressure and velocity fluid whereby centrifugal force creates a static pressure head in said initial outlet portion, said initial outlet portion being substantially aligned with the direction of the high velocity fluid flow substantially at the outlet of said pump element to receive and convert velocity head to pressure head to augment said static pressure head in said initial outlet portion to circulate fluid through said outlet passage means, said outlet passage means having a passage portion connecting said initial outlet portion to said exhaust, said passage portion being isolated from said operating and torus chambers except through said initial outlet portion to maintain the pressure head to circulate fluid.

2. In a fluid drive; an input member, an output member, a housing rotor driven by said input member and providing an operating chamber and having pump means, a turbine rotor drivingly connected to said output member and located in said operating chamber and having blades and an external wall defining the exterior of the turbine portion of a torus chamber, said pump means being located in said operating chamber and having blades and a wall defining the exterior of the pump portion of the torus chamber, said pump means having an inlet at an inner diameter and an outlet at the outer diameter of the torus chamber to circulate fluid in a torus flow path in the torus chamber from said pump inlet to said pump outlet and to discharge fluid at a high velocity in a discharge direction to circulate fluid through the turbine, said torus chamber having a low pressure zone adjacent said pump inlet and a high pressure zone in the outer diameter portion of said torus chamber in an area of said pump outlet, supply means having ingress and egress means, said egress means being connected to said torus chamber to supply fluid to said torus chamber at said pump inlet in said low pressure zone to substantially fill said torus chamber, and outlet passage means extending radially inward and through said housing in the neighborhood of the axis of the housing connecting said torus chamber to said ingress means, said outlet passage means having an initial outlet portion, located in the torus chamber defined by said external walls in said high pressure zone, having a mouth communicating with said high velocity fluid whereby centrifugal force creates a static pressure head in said initial outlet portion, said initial outlet portion being substantially aligned with said discharge direction of the high velocity fluid flow substantially at the outlet of said pump element to receive and convert velocity head to pressure head to augment said static pressure head in said initial outlet portion to circulate fluid through said outlet passage means, said outlet passage means having a passage portion connecting said initial outlet portion to said ingress means, said passage portion being isolated from said operating and torus chambers except through said initial outlet portion to maintain the pressure head to circulate fluid.

3. The invention defined in claim 2 and said initial outlet portion of said outlet passage means being located on one of said rotors.

4. In a fluid drive, an input member, an output member, a housing driven by said input member and providing an operating chamber, said housing having pump means, a turbine element drivingly connected to said output member and located in said operating chamber and having blades and an external wall defining the exterior of the turbine portion of a torus chamber, said turbine element having an inlet at the outer diameter of the torus chamber and an outlet, said pump means being located in said operating chamber and having blades and a wall defining the exterior of the pump portion of the torus chamber, said pump means having an inlet at an inner diameter and an outlet at the outer diameter of the torus chamber to circulate fluid in a torus flow path in the torus chamber from said pump inlet to said pump outlet and to discharge fluid at a high velocity in a direction to flow to said turbine inlet and circulate to the turbine outlet and pump inlet, said torus chamber having a low pressure zone adjacent said pump inlet and a high pressure zone in the outermost diameter portion of said torus chamber near said pump outlet, supply means having ingress and egress means, said egress means being connected to said torus chamber to supply fluid to said torus chamber at said pump inlet in said low pressure zone to substantially fill said torus chamber, and outlet passage means extending radially inward and through said housing near the axis of the housing connecting said torus chamber to said ingress means of said supply means, said outlet passage means having an initial outlet portion mounted on said turbine element and located in said torus chamber in said high pressure and velocity zone having a mouth communicating with said high velocity fluid whereby centrifugal force creates a static pressure head in said initial outlet portion, said initial outlet portion being in substantial alignment with the direction of high velocity fluid flow of said pump element to receive and convert velocity head to pressure head in said initial outlet portion to augment said static pressure head to circulate fluid through said outlet passage means, said outlet passage means having a passage portion connecting said initial outlet portion to said ingress means of said supply means, said passage portion being isolated from said operating and torus chambers except through said initial outlet portion to maintain the augmented pressure head to circulate fluid.

5. In a fluid drive, an input member, an output member, a housing driven by said input member and providing an operating chamber, said housing having pump means, a turbine element drivingly connected to said output member and located in said operating chamber and having blades and an external wall defining the exterior of the turbine portion of a torus chamber, said turbine element having an inlet at the outer diameter of the torus chamber and an outlet, said pump means being located in said operating chamber and having blades and a wall defining the exterior of the pump portion of the torus chamber, said pump means having an inlet at an inner diameter and an outlet at the outer diameter of the torus chamber to circulate fluid in a torus flow path in the torus chamber from said pump inlet to said pump outlet and to discharge fluid at a high velocity in a direction to enter said turbine inlet and circulate to the turbine outlet and pump inlet, said torus chamber having a low pressure zone adjacent said pump inlet and a high pressure zone in the outermost diameter portion of said torus chamber in an area of said pump outlet and turbine inlet and in which the direction of fluid flow is changed from radially outward to radially inward, supply means having ingress and egress means, said egress means being connected to said torus chamber to supply fluid to said torus chamber at said pump inlet in said low pressure zone to substantially fill said torus chamber, and outlet passage means connecting said torus chamber to said ingress means of said supply means, said outlet passage means having an initial outlet portion mounted on said turbine element and located in the torus chamber of said external turbine wall in said high pressure and velocity zone and having a mouth communicating with said high velocity fluid whereby centrifugal force creates a static pressure head in said initial outlet portion, said initial outlet portion being in substantial alignment with the direction of high velocity fluid flow of said pump element to receive and convert velocity head to pressure head in said initial outlet portion to augment said static pressure head to circulate fluid through said outlet passage means, said outlet passage means having a passage portion connecting said initial outlet portion to said ingress means of said supply means, said passage portion being isolated from said operating and torus chambers except through said initial outlet portion to maintain the augmented pressure head to circulate fluid.

6. In a torque converter, an input member, an output member, a housing driven by said input member and providing an operating chamber and having pump means, a turbine element drivingly connected to said output member and located in said operating chamber and having blades and an external and an internal wall defining respectively the exterior and interior of the turbine portion of a torue chamber, said turbine element having an inlet at the outer diameter of the torus chamber and an outlet, a stator in the torus chamber, said pump means being located in said operating chamber and having blades and an external and an internal wall defining respectively the exterior and interior of the pump portion of the torus chamber, said pump means having an inlet at an inner diameter and an outlet at the outer diameter of the torus chamber to circulate fluid in a torus flow path in the torus chamber, pump and turbine torus chamber portions from said pump inlet to said pump outlet and to discharge fluid at a high velocity in a direction to enter said turbine inlet and circulate through the turbine and stator, said torus chamber having a low pressure zone adjacent said pump inlet and a high pressure zone in the outermost diameter portion of said torus chamber in an area of said pump outlet and turbine inlet radially beyond said internal wall, supply means having ingress and egress means, said egress means being connected to said torus chamber to supply fluid to said torus chamber at said pump inlet in said low pressure zone to substantially fill said torus chamber, and outlet passage means connecting said torus chamber to said ingress means of said supply means and said outlet passage means having an initial outlet portion mounted on said turbine element and located in the torus chamber in said external wall of said turbine in said high pressure and velocity zone and having a mouth communicating with said high pressure fluid whereby centrifugal force creates a high static pressure head in said initial outlet portion, said initial outlet portion being in substantial alignment with said direction of the high velocity outlet flow of said pump element to receive and convert velocity head to pressure head in said initial outlet portion to augment the static pressure head to circulate fluid through said outlet passage means, said outlet passage means having a passage portion connecting said initial outlet portion to said ingress means of said supply means, said passage portion being isolated from said operating and torus chambers except through said initial outlet portion to maintain the pressure head to circulate fluid.

References Cited in the file of this patent

UNITED STATES PATENTS

| | | |
|---|---|---|
| 1,389,562 | Schneider | Aug. 30, 1921 |
| 1,910,697 | Kiep | May 23, 1933 |
| 2,127,738 | Kugel | Aug. 23, 1938 |
| 2,143,312 | Griswold | Jan. 10, 1939 |
| 2,150,539 | Carson et al. | Mar. 14, 1939 |
| 2,363,983 | Miller | Nov. 28, 1944 |
| 2,453,877 | Trail | Nov. 16, 1948 |
| 2,457,692 | La Brie | Dec. 28, 1948 |
| 2,461,217 | Lapsley et al. | Feb. 8, 1949 |
| 2,679,728 | Trail | June 1, 1954 |
| 2,701,531 | English | Feb. 8, 1955 |
| 2,779,292 | Zeidler | Jan. 29, 1957 |
| 2,801,521 | Jandasek | Aug. 6, 1957 |
| 2,961,830 | Dundore et al. | Nov. 29, 1960 |

FOREIGN PATENTS

| | | |
|---|---|---|
| 903,776 | France | Feb. 5, 1945 |
| 1,002,800 | France | Nov. 7, 1951 |